United States Patent

[11] 3,599,763

[72] Inventor Ronald D. Bailey
 South Bend, Ind.
[21] Appl. No. 5,641
[22] Filed Jan. 26, 1970
[45] Patented Aug. 17, 1971
[73] Assignee The Bendix Corporation

[54] ANCHOR PISTON FOR WEDGE BRAKE
 5 Claims, 6 Drawing Figs.
[52] U.S. Cl. .................................................. 188/326,
 188/343, 188/364
[51] Int. Cl. ......................................................F16d 51/18,
 F16d 51/60
[50] Field of Search........................................... 188/78,
 78.24, 152.82, 326, 343, 364

[56] References Cited
UNITED STATES PATENTS
3,037,584 6/1962 Cox, Jr. et al................. 188/78.24
2,374,536 4/1945 Goepfrich..................... 188/78.24
2,319,583 5/1943 Chambers..................... 188/152.82

*Primary Examiner*—Milton Buchler
*Assistant Examiner*—Stephen G. Kunin
*Attorneys*—W. N. Antonis and Plante, Arens, Hartz, Smith and Thompson ABSTRACT: An anchor piston for a wedge brake includes a cylinder having a closed end engaging the wedge actuator and an opposite open end. An insert is slidably received in the cylinder and includes a portion projecting from the cylinder and having a slot formed therein which is adapted to receive one end of a brakeshoe. The portion of the insert which is disposed in the cylinder is provided with an axially extending surface having a pair of opposed end portions adjacent the wall of the cylinder. A pin projects from the wall of the cylinder and engages one of the opposed end portions to properly position the slot to receive the brakeshoe. By rotating the insert so that the pin engages the other one of the opposed end portions, the piston may be used in the brake mounted on the other side of the vehicle.

INVENTOR.
RONALD D. BAILEY

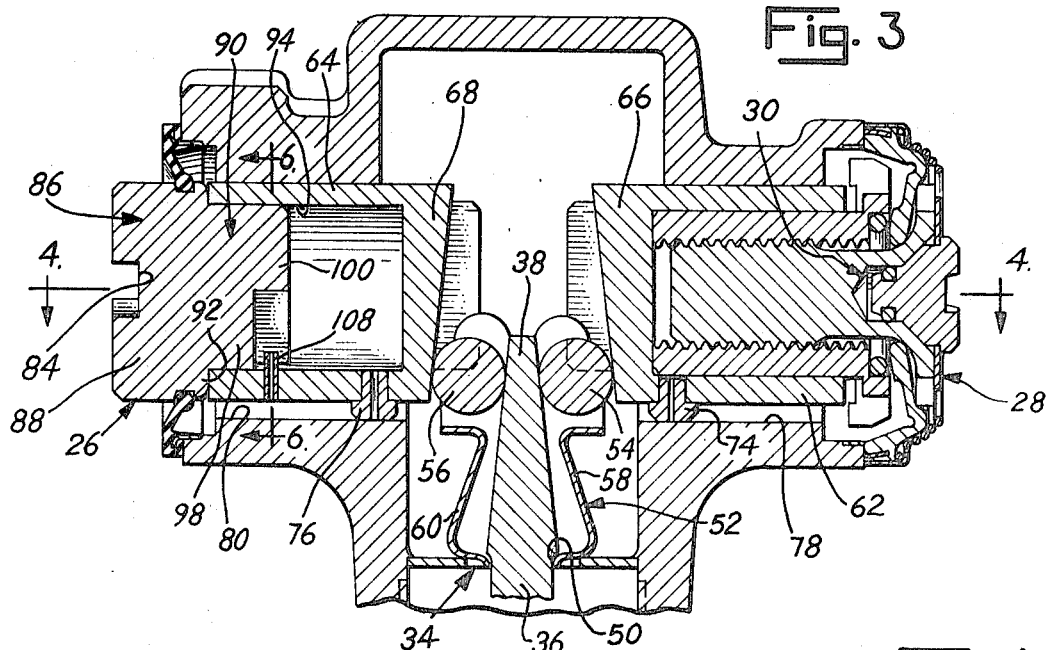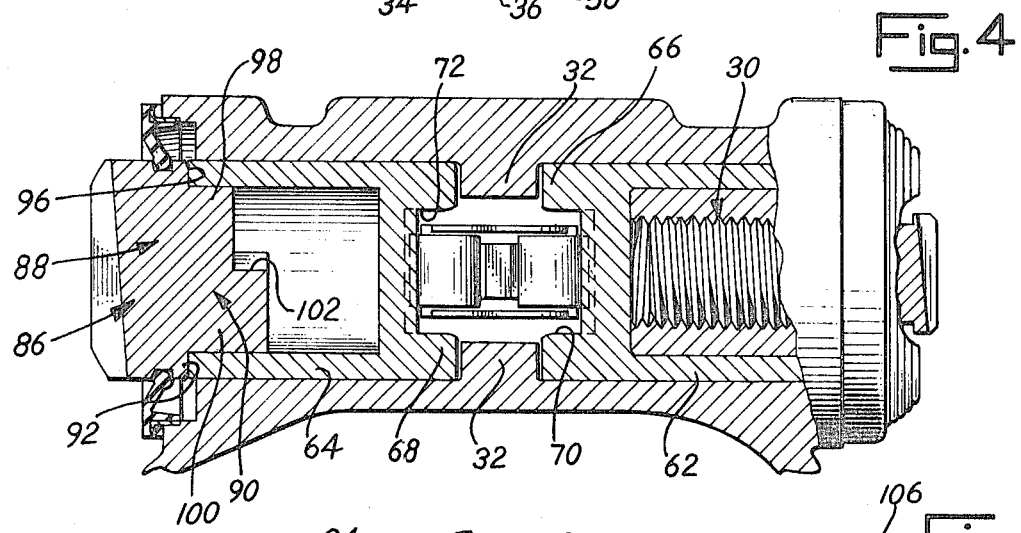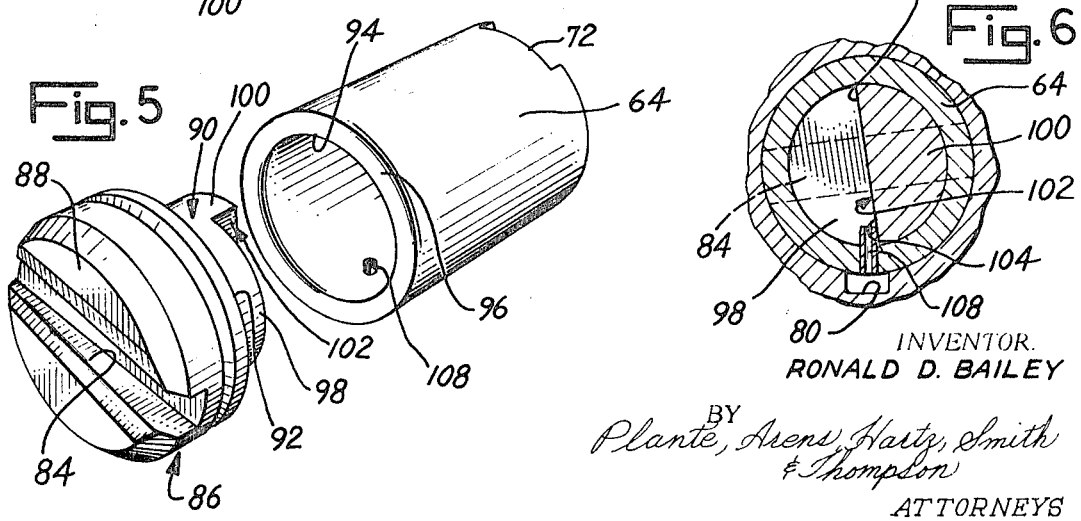

ANCHOR PISTON FOR WEDGE BRAKE

BACKGROUND OF THE INVENTION

This invention relates to a wedge-actuated drum brake.

Wedge-actuated drum brakes have become increasingly popular in recent years, particularly for heavy-duty truck applications. Such brake usually provide a pair of wedge actuators, each of which spreads apart a pair of pistons which are connected to the ends of the brakeshoes thereby forcing the latter against the rotating drum. The actuators project from the side of the torque member adjacent the vehicle and usually form a small angle with respect to the vehicle axle. Although this angle is small (a common design provides an angle of only 11°) the fact that it exists requires that the pistons used on brakes mounted on the right side of the vehicle be different from those used on the left side.

SUMMARY OF THE INVENTION

Therefore, an important object of my invention is to provide an anchor piston for wedge brakes that may be used on either side of the vehicle.

Another important object of my invention is to substantially reduce the weight and cost of anchor pistons used in wedge brakes.

An additional important object is to reduce the possibility of improper assembly of wedge brakes.

A further important object of my invention is to substantially reduce the number of different parts required in a wedge brake.

DESCRIPTION OF THE DRAWINGS

FIG. 3 is a fragmentary cross-sectional view taken substantially along line 3-3 of FIG. 2;

FIG. 4 is a cross-sectional view taken substantially along line 4-4 of FIG. 3;

FIG. 5 is an exploded, perspective view of an anchor piston made pursuant to the teachings of my present invention for use with the brake illustrated in FIGS. 1-4; and FIG. 6 is a fragmentary, cross-sectional view taken substantially along lines 6-6 of FIG. 3.

DETAILED DESCRIPTION

Figure 1:
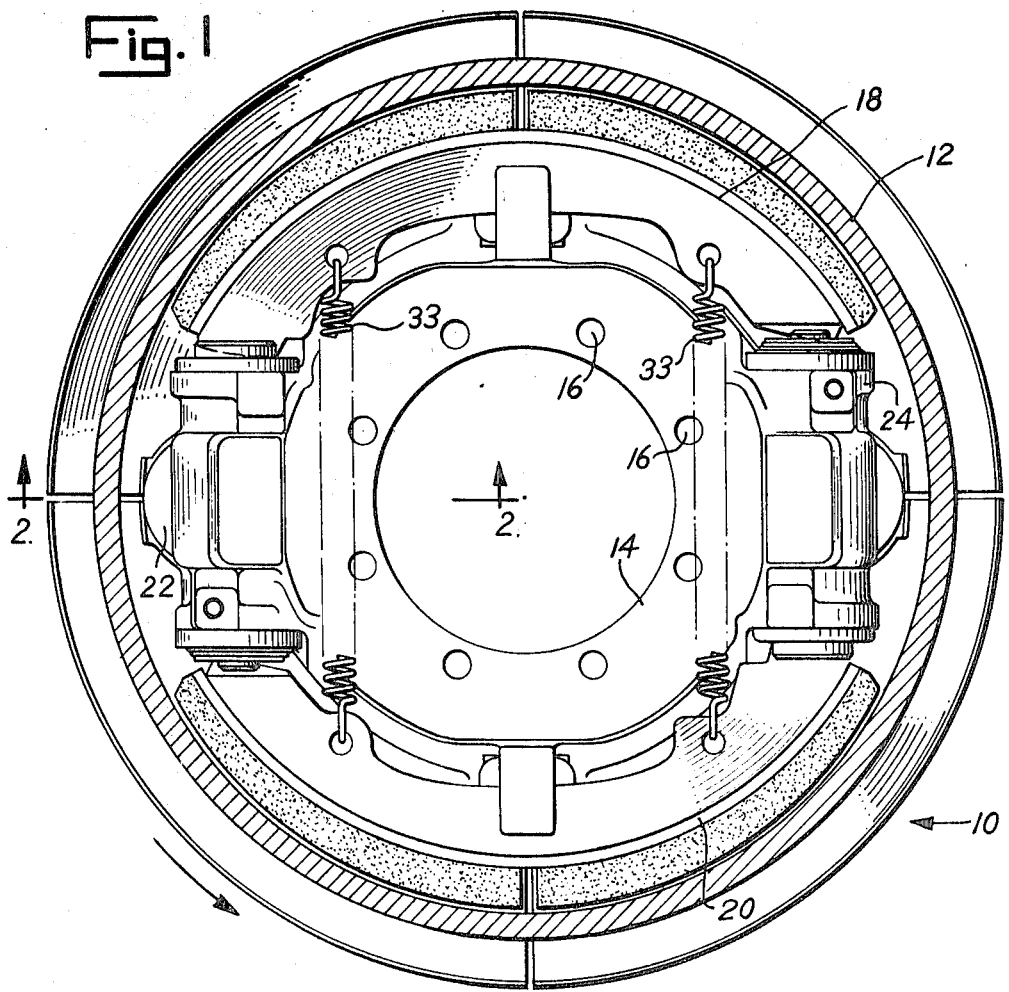
FIG. 1 is a front elevational view of a brake assembly made pursuant to the teachings of my present invention.

Referring now to the drawings, brake assemblies 10 and 11 are mounted on the right and left sides of a vehicle, respectively, and each include a drum 12 mounted for rotation with a member to be braked. A torque member 14 is mounted on a nonrotative part of the vehicle, such as the axle flange, by inserting bolts through circumferentially spaced openings 16. A pair of brakeshoes 18, 20 are slidably mounted on the torque member 14 for movement toward and away from the drum 12. A pair of diametrically opposed housings 22, 24 are formed integrally with the torque member 14 between adjacent ends of the shoes 18, 20. Each of the housings 22, 24 contains a pair of piston assemblies 26, 28, the latter of which contains an adjuster mechanism generally indicated at 30 for moving the shoes 18, 20 closer to the drum to compensate for wear of the friction material. Adjuster mechanism 30 is disclosed in detail in U.S. Pat. No. 3,246,723, owned by the assignee of the present invention and incorporated herein by reference. The piston assemblies 26, 28 each abut anchor flanges 32 when the brakes are released, and one of the piston assemblies 26 or 28 anchors on the flanges 32 during a brake application, depending upon the direction of drum rotation. A pair of return springs 33 yieldably bias the shoes 18, 20 away from the drum 12.

Figure 2:
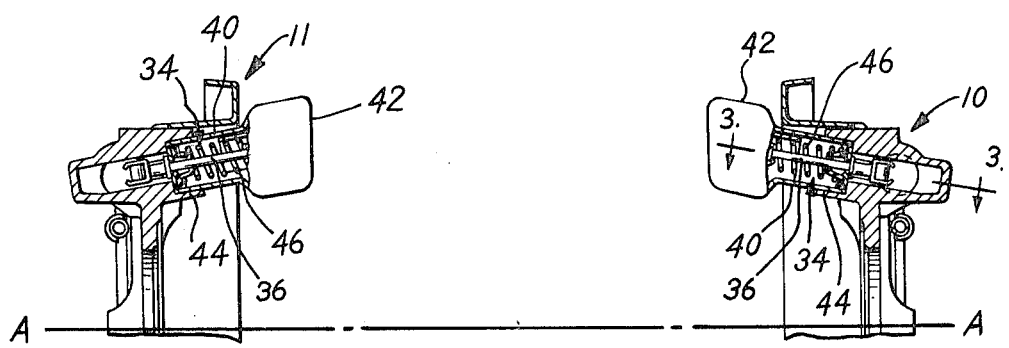
FIG. 2 is a fragmentary cross-sectional view taken substantially along line 2-2 in FIG. 1 through both left and right brakes of the vehicle.

Piston assemblies 26 and 28 are spread by an actuating mechanism 34 which may be of any well-known arrangement such as that disclosed in U.S. Pat. No. 3,362,506, owned by the assignee of the present invention, and incorporated herein by reference. Briefly, actuating mechanism 34 includes a pushrod 36 which projects outwardly from the plane defined by the torque member 14 at a small angle respect to the centerline A-A of the vehicle axis, as shown in FIG. 2. Pushrod 36 has a wedge-shaped actuating end 38 located between the piston assemblies 26 and 28 and is guided for reciprocating movement in a neck 40 of a pneumatic chamber 42 and in a tubular portion 44 of the housing 22 that projects outwardly from the cylindrical portion of the housing 22 in which the piston assemblies 26 and 28 slide. A caged spring 46 engages the pushrod 36 to bias the latter outwardly from the torque member 14 toward the brake release position. The pushrod 36 extends through an opening 50 in a U-shaped guide member 52 which carries a pair of rollers 54, 56 on its resilient arms 58, 60 respectively. The details of the construction and operation of the actuating mechanism 34 are described in detail in the aforementioned U.S. Pat. No. 3,362,506 and will not be mentioned further herein.

Each of the piston assemblies 26, 28 includes a hollow cylinder 62, 64, each of which has a closed end 66, 68 respectively. Grooves 70, 72 are formed in the closed ends 66, 68 of each cylinder 62, 64 to accommodate the wedge 38 and the guide member 52 that spread the cylinders 62, 64 apart when the brake is actuated, as is more completely described in the above-referenced U.S. Pat. No. 3,362,506. Lugs 74, 76 project from the outer wall of each of the cylinders 62 and 64 and are slidably received in grooves 78, 80 which are provided in the inner wall of the housing 22. The lugs 74, 76 insure proper positioning of the cylinders 62 and 64 in the housing 22, so that the grooves 70, 72 are oriented properly to receive the wedge 38 and guide member 52 when the brake is actuated.

The relative positions of the pistons 26, 28 must be the same in brakes on both the right and left sides of the vehicle. Therefore, if the anchor piston 26 in the housing 22 in the brake 10 points toward the front of the vehicle the corresponding piston in the brake 11 must also point toward the front of the vehicle. Since the actuating mechanisms 34 on both of the brakes 10 and 11 must extend outwardly from the back side of the torque member 14 and must diverge from the axis of the axle, the grooves 70 and 72 in the cylinders 62, 64 of the brakes 10 and 11 must be allochirally disposed with respect to the centerline A-A of the axle of the vehicle. To insure proper orientation of the grooves 70 and 72, grooves 78 and 80 are machines in different positions in the housings 22, 24 of the brake 10 than are the corresponding grooves in the housings of the brake 11. In prior art brakes that usually used a solid piston 26, different pistons 26 must be used in the right and left brakes to provide the proper orientation of a slot 84 on the outermost end of the piston 26 that engages the corresponding end of one of the shoes 18 or 20.

The present invention permits use of a common anchor piston assembly 26 in the brakes on both sides of the vehicle. Piston assembly 26 includes the cylinder 64 and a piston insert 86. Insert 86 has a larger diameter portion 88 in which the slot 84 is formed and a smaller diameter portion 90 presenting a shoulder 92 at its juncture with the larger diameter portion 88. The smaller diameter portion 90 is slidably received in the bore 94 defined by the cylinder 64, and the shoulder 92 engages the end 96 of the cylinder 64. Smaller portion 90 is stepped to present longer and shorter axially extending sections 98 and 100 respectively which define an axially extending surface 102 at their juncture. Surface 102 has a pair of diametrically opposed end sections 104 and 106, respectively, each of which is disposed adjacent the wall of the bore 94. A pin 108 extends through the wall of the cylinder 64 and projects into the bore 94. The piston insert 86 may be rotated with respect to the cylinder 64 so that either of the end portions 104 or 106 of the surface 102 may be brought into engagement with the pin 108. The slot 84 may thus be oriented in the proper position for either the right or left brakes 10 or 11, depending upon which of the end portions 104 or 106 is brought into engagement with the pin 108.

When the brake is assembled, the mechanic inserts the cylinder 64 in one of the housings 22 or 24, engaging the lug 76 in the groove 80. Since the groove 80 is machined in a slightly different circumferential location on the brakes for left and right sides of the vehicle, proper orientation of the groove 72 is assured. The mechanic then slides the insert 86 into the open end of the cylinder 64, and rotates the insert until the pin 108 engages one of the end portions 104 or 106. If the mechanic should bring the pin 108 in contact with the wrong one of the portions 104 or 106, he will be unable to insert the brake shoe 18 or 20 into the slot 84, since the shoe will interfere with the torque member 14. The mechanic then rotates the insert 86 until the pin 108 engages the other one of the end portions 104 or 106, thus assuring proper assembly of the unit.

In operation, cylinder 42 is pressurized, forcing the wedge 38 and carrier between the piston assemblies 26 and 28, spreading the latter apart, thereby forcing the shoes 18 and 20 into frictional engagement with the drum 12. Assuming rotation of the drum 12 in the direction of the arrow, the shoes 18 and 20 will be carried with the drum 12 until the rear face of the anchor piston assembly 26 engages the anchor flanges 32. The shoes 18 and 20 remain in frictional engagement with the drum 12 until the vehicle operator reduces the pressure in the cylinder 42, permitting the caged spring assembly 46 to drive the wedge 38 and carrier 52 from between the piston assemblies 26 and 28 to permit return springs 110 to drive the shoes 18 and 20 away from the drum 12. The operation of the brake is described in detail in the above-referenced U.S. Pat. No. 3,362,506.

I claim:

1. In a brake:
   a drum mounted for rotation with a member to be braked;
   a torque member;
   a pair of brakeshoes slidably mounted on said torque member for movement toward and away from said drum;
   a housing defining a bore therewithin mounted on said torque member between adjacent ends of shoes;
   actuating means mounted on said torque member extending into said bore; and
   a piston assembly slidable in said bore extending between said actuating means and one end of one of said shoes for transmitting motion of the actuating means to the one shoe;
   said piston assembly including an annular member operably connected to said actuating means and having an open end, an insert member slidably received in said open end operably connected to said shoe, radially extending abutment means carried by one of said members, and axially extending positioning means on the other member engaging the abutment means to position said insert member rotationally with respect to said annular member;
   said abutment means being a pin projecting radially inwardly from the circumferentially extending wall of said annular member for engagement by the insert member.

2. The invention of claim 1:
   said positioning means being an axially extending surface on said insert member;
   said pin engaging said surface.

3. The invention of claim 1:
   said insert member having longer and shorter axially extending portions defining an axially extending shoulder therebetween, said axially extending shoulder defining said positioning means;
   said abutment means being a pin extending from the circumferentially extending wall of the annular member for engagement by said shoulder.

4. The invention of claim 1:
   said annular member having a closed end for engagement by said actuating means;
   said insert member having a slot in one end thereof for receiving an end of said one brakeshoe;
   said abutment means being a pin projecting from the circumferentially extending wall of the annular member;
   said positioning means being an axially extending surface on said insert member extending across the inner diameter of said annular member;
   said surface having a pair of opposed end portions adjacent the inner circumferential wall of said annular member;
   said pin being adapted to engage either of said end portions to thereby orient said slot in either of two positions.

5. In a vehicle having a pair of wheels mounted on opposite sides of the vehicle:
   a brake assembly for each of said wheels;
   each of said brake assemblies including a torque member, a pair of brakeshoes slidably mounted on said torque member, a housing defining a bore therewithin mounted on said torque member between adjacent ends of said shoes, actuating means mounted on said torque member projecting into said bore, a piston assembly slidable in said bore extending between the actuating means and one end of one of said shoes;
   said piston assemblies including a cylinder defining a chamber therewithin having a closed end for engagement by the actuating means and an open end, an insert slidably received in said open end, one end of said insert projecting from said cylinder having a slot for receiving one end of said one brakeshoe, the other end of said insert having an axially extending surface extending across said chamber, said surface having a pair of opposed side portions adjacent the wall of the cylinder, and a pin projecting from the wall of said cylinder;
   the pin in the brake assembly mounted on one side of the vehicle engaging one of said opposed side portions of said axially extending insert surface to position the slot to receive the end of the shoe carried in the brake assembly on the one side of the vehicle;
   the insert in the brake assembly mounted on the other side of the vehicle being disposed so that the other side portion of said axially extending insert surface engages said pin, to thereby position its slot to receive the end of the shoe carried in said brake assembly mounted on the other side of the vehicle.